Dec. 30, 1952  A. F. HICKMAN  2,623,757
TANDEM AXLE SPRING SUSPENSION
Filed April 4, 1950  5 Sheets-Sheet 1

INVENTOR.
Albert F. Hickman
BY
Popp and Popp
Attorneys.

Dec. 30, 1952  A. F. HICKMAN  2,623,757
TANDEM AXLE SPRING SUSPENSION
Filed April 4, 1950  5 Sheets-Sheet 2

INVENTOR.
Albert F. Hickman
BY
Popp and Popp
Attorneys.

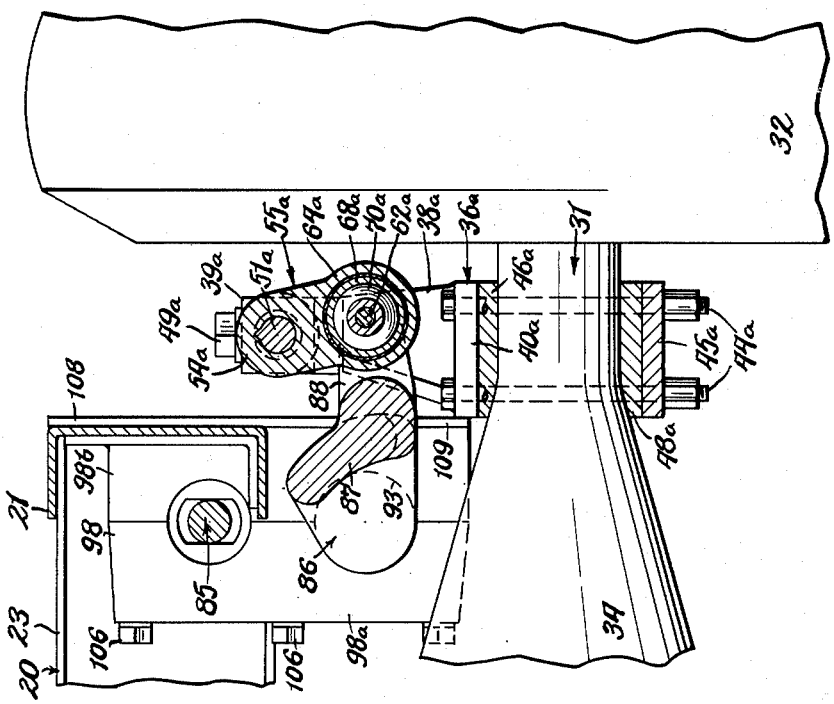
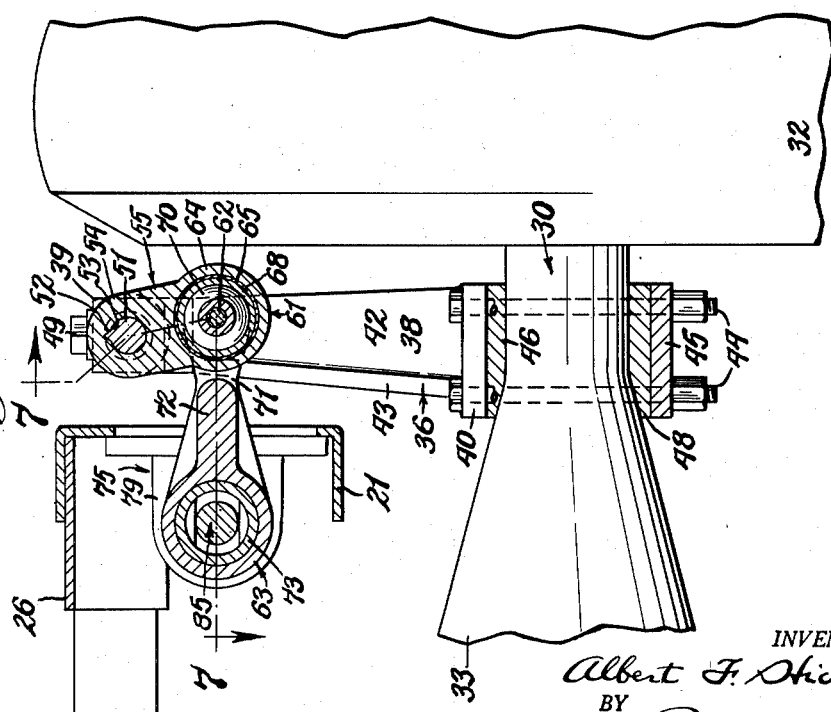

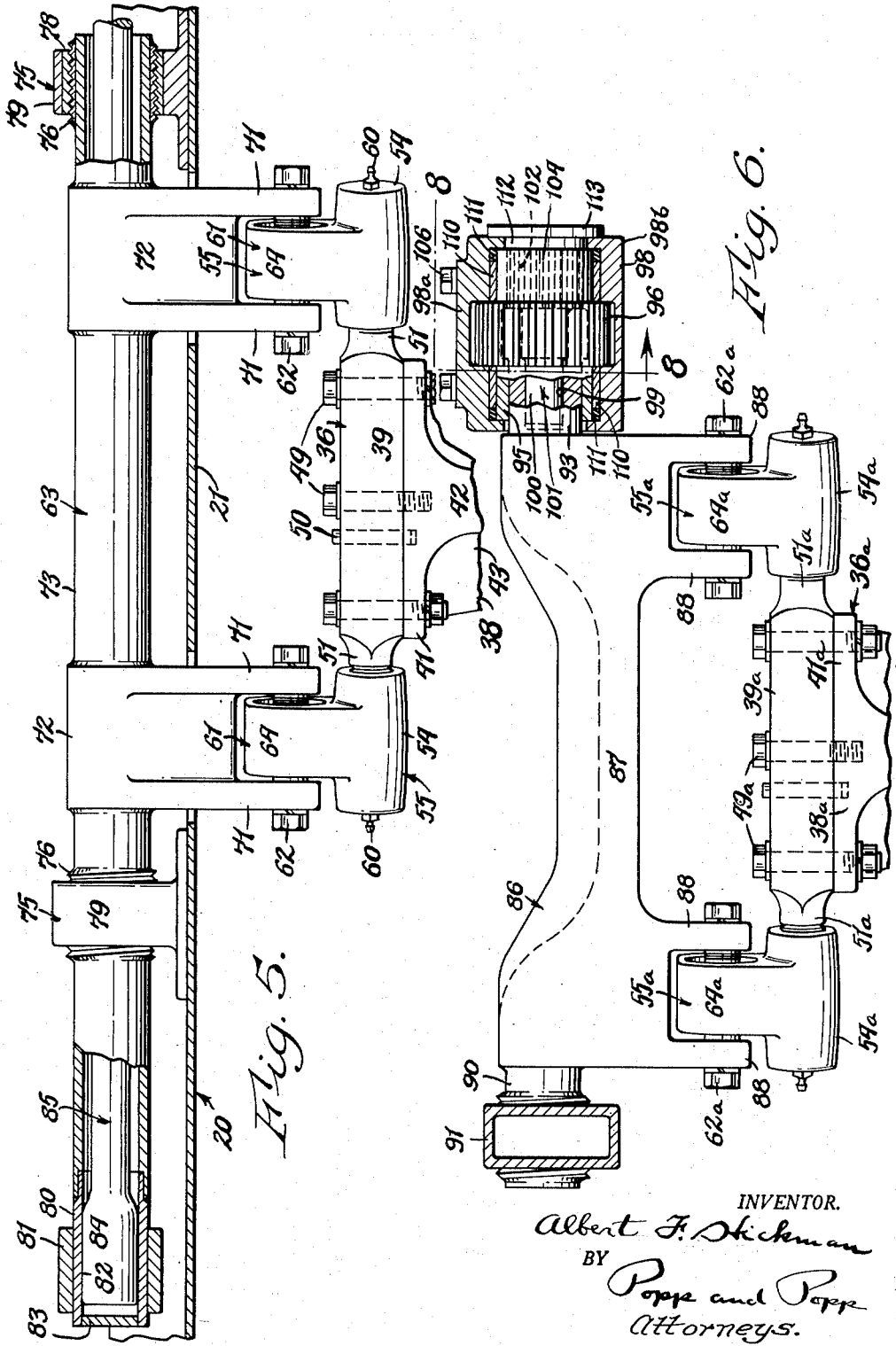

Dec. 30, 1952    A. F. HICKMAN    2,623,757
TANDEM AXLE SPRING SUSPENSION
Filed April 4, 1950    5 Sheets-Sheet 5
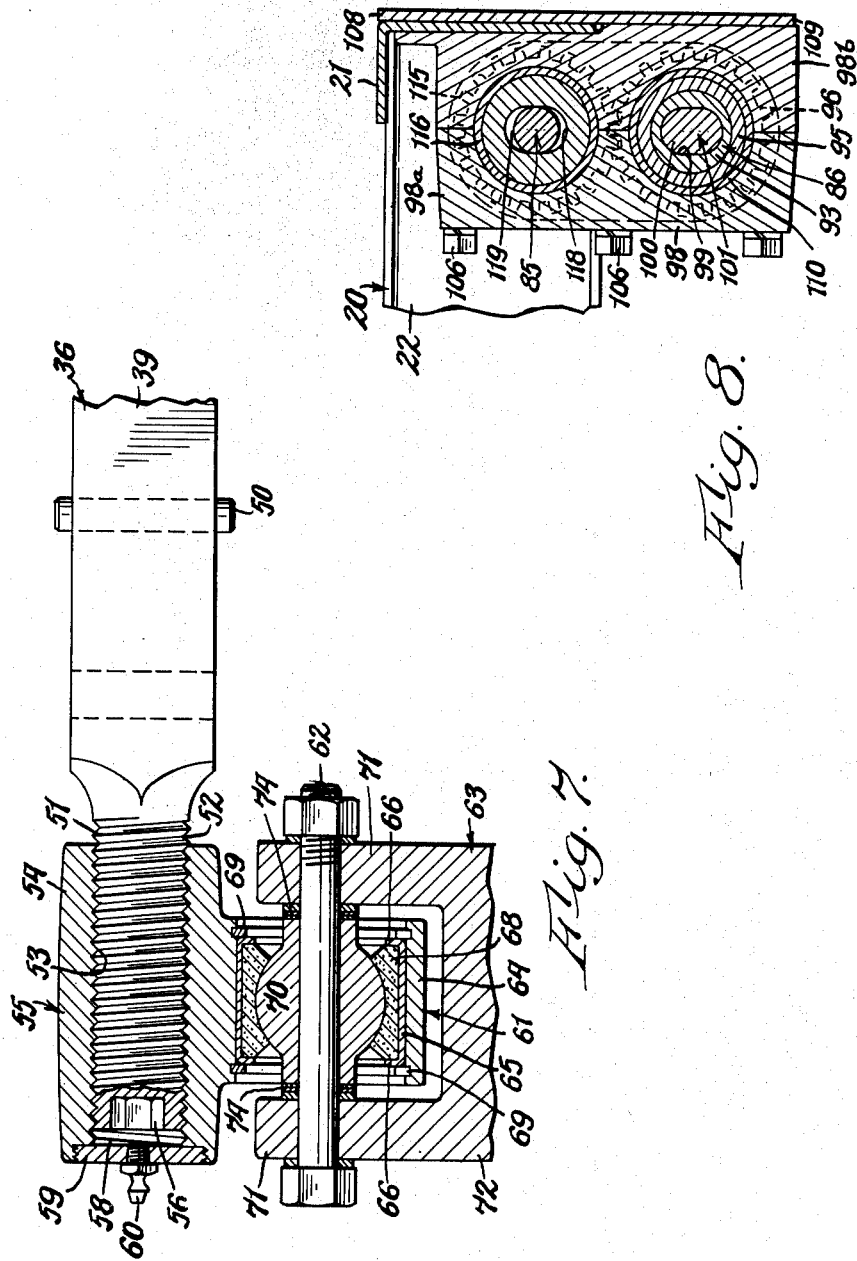
INVENTOR.
Albert F. Hickman
BY
Popp and Popp
Attorneys.

Patented Dec. 30, 1952

2,623,757

UNITED STATES PATENT OFFICE 2,623,757

TANDEM AXLE SPRING SUSPENSION

Albert F. Hickman, Eden, N. Y., assignor to Hickman Industries, Inc., Eden, N. Y., a corporation of New York Application April 4, 1950, Serial No. 153,932

16 Claims. (Cl. 280—104.5)

This invention relates to a spring suspension particularly for tandem axle trucks in which each axle is permitted to move against a geometric resilient resistance both laterally and longitudinally relative to the vehicle frame particularly where the vehicle has a high percentage of load variation.

The invention is particularly directed to the form of torsion road tandem axle forming the subject of the Hickman Patent No. 2,333,650, dated November 7, 1943, and while it is more particularly described in connection with a truck, it is also applicable to other land vehicles such as railroad cars.

In common with the said Hickman patent important objects of the present invention are to provide a spring suspension (1) which will function to safely support the vehicle body at high speeds, both when loaded and unloaded; (2) which reduces and cushions both the vertical and lateral impacts from the axle against the body of the vehicle, both when the vehicle is loaded and unloaded and without imposing undue end thrusts on the pivotal connections which connect the axles to the body; (3) in which torsion rods are employed to provide a longer and variable spring resistance range; (4) in which geometric resilient resistance is obtained in a compact structure which requires no lubrication and is free from the squeaks incident to the use of leaf springs; (5) in which the distribution of the load to the body is at a plurality of spaced points; (6) in which side sway is reduced to any desired amount; (7) in which periodic vibration of the suspension is damped out and in which wheel tramp is avoided; (8) in which all forces are cushioned so as to increase gasoline mileage and tire wear; (9) which has light unsprung weight; (10) in which the metal stresses are within safe working limits of heat treated castings or forgings; (11) which can be produced at low cost and in particular requires only simple machining operations; (12) in which the parts are arranged inside the wheels and in which the parts are arranged close to the wheels to provide high and wide pivot positions and increased stability; (13) which can easily be taken down and repaired; (14) in which any desired frequency or degree of spring deflection can be obtained; (15) in which auxiliary devices for the control of side sway are rendered unnecessary; (16) in which one or both of the tandem axles are self-steering so that when rounding a curve, said tandem axles are caused to assume such an angle relative to each other as will enable a pure rolling action to be obtained; (17) which includes compensating means connecting the companion ends of the tandem axles and through which the excess load on either axle is transmitted to the other axle; (18) in which said compensating means is in the form of a simple transmission arranged so that the excess stress on either torsion rod is transmitted to the other to transmit the load from one axle to the other; (19) in which the transfer of the load from the tandem axles to the front axle of the vehicle, under braking reaction, is identical with the similar transfer of the load in a two-axle vehicle of the same wheel base, weight and load; (20) in which all connections to the frame are in closely spaced relation to each other thereby to reduce to a minimum any distortion of the suspension through weaving of the frame; (21) in which all connections to the frame are made to the longitudinal side bars thereof to simplify application of the suspension and design of the frame and suspension and to further reduce the effect of weaving of the frame upon the suspension; and (22) in which will stand up under conditions of severe and constant use with very little servicing.

The principal specific object of the present invention is to provide such a tandem axle spring suspension which is particularly applicable to all types of trucks.

In particular a specific object is to provide such a tandem axle torsion spring suspension to fit a truck having a wide frame, and having large tires, it having been found difficult, with the suspension shown in the said patent to accommodate frames over thirty inches wide with 11 inch tires. Frames 34 inches wide with 11 or 12 inch tires must be arranged for and still have room for drive shaft.

Another specific object is to provide such a tandem axle torsion rod spring suspension in which the tandem axles are self-steering, as with the suspension shown in the said Hickman patent, so that when rounding a curve the tandem axles are caused to assume such an angle relative to each other as will enable a pure rolling action to be obtained and which, at the same time, avoids the necessity of arranging the pivot pins at an angle to the frame to accomplish this purpose. Such angular pivot pins, as shown in the said Hickman patent, are adaptable to a trailer having a thirty inch frame but not to a truck having a thirty-four inch frame because of the lack of sufficient room between the truck frame and the tires. Further, such angular pivot pins prevented the application to trucks having tires larger than nine inches, again because of lack of sufficient clearance between the frame and the tires.

Another object is to provide such self-steering tandem axles which are connected to the vehicle frame by simple pivot joints, certain of these pivot joints being ball and socket joints to enable such self-steering.

Another object is to provide a vehicle spring suspension which can be easily serviced. In particular, the shackles of the ssupension, which require the most frequent servicing, can be readily removed on jacking up the vehicle body and replaced with new or factory rebuilt shackles, thereby to avoid a difficult field operation and also to avoid withholding the truck from service for any great length of time.

Other specific objects and advantages will appear from the following description and accompanying drawings in which:

Figs. 3 and 4 are enlarged fragmentary vertical transverse sectional views taken on the correspondingly numbered lines of Fig. 1.

Fig. 5 is an enlarged fragmentary horizontal section, with most of the parts in plan, taken on line 5—5, Fig. 2, and showing the axle bracket, shackles and crank arm, which connect the axle with the torsion rod on the vehicle frame, laid out horizontally to better disclose the construction and operation of these parts.

Fig. 6 is an enlarged fragmentary horizontal section, with most of the parts in plan, taken generally on line 6—6, Fig. 2 and similarly showing the axle bracket, shackles and crank arm, which connect the axle with the torsion rod on the vehicle frame, laid out horizontally to better disclose the construction and operation of these parts.

Fig. 7 is an enlarged fragmentary section, taken on line 7—7, Fig. 3, the parts being laid out, as indicated in Fig. 3.

Fig. 8 is an enlarged fragmentary vertical section, taken on line 8—8, Fig. 6.

Figure 1:
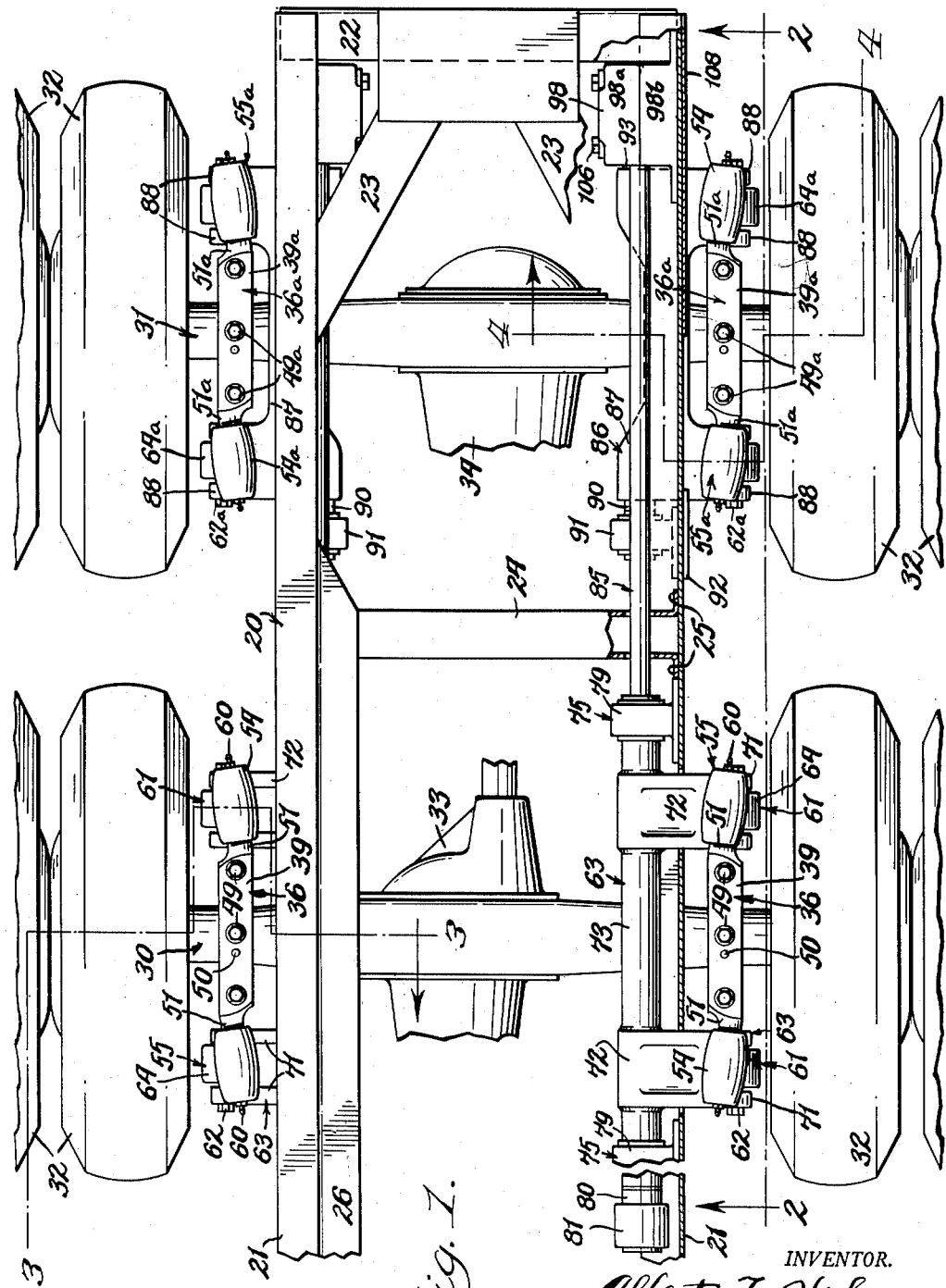
Fig. 1 is a fragmentary top plan view, partly in section, of a truck frame supported by a tandem axle spring suspension embodying my invention.
Figure 2:
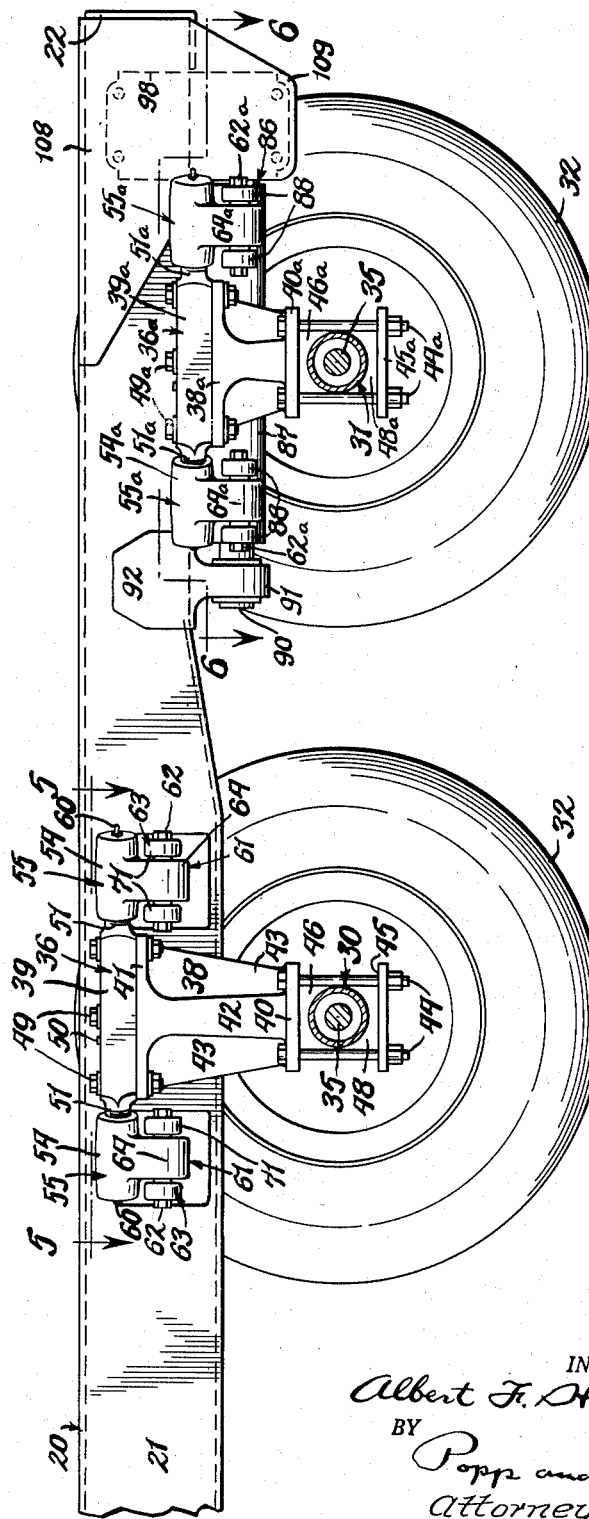
Fig. 2 is a vertical longitudinal section thereof, taken on line 2—2, Fig. 1.

This invention is shown in connection with a highway truck, the frame 20 of which is shown as including a pair of main longitudinal side frame bars 21 of channel shape in cross section and arranged with their channels opposing each other. These side frame bars 21 of the frame are joined at their rear extremities by a cross frame bar 22 which is also shown as being channel shaped in cross section with its channel facing forwardly. For strength, diagonal brace channels 23 are preferably interposed between each side frame bar 21 and the central part of the rear cross frame bar 22 in any suitable manner. In addition the truck frame 20 is shown as including a pair of cross frame bars 24, one being shown, and each of channel shape in cross section with its channel facing downwardly. Each end of each of these cross frame bars 24 is shown as secured to the web of the corresponding main longitudinal side frame bar 21 by a pair of end flanges 25 and each main longitudinal side frame bar 21 is preferably reinforced by a top plate 26 welded along one side of the underside of the top flange of the main longitudinal side frame bar 21 and extending along the upper faces of the pair of cross frame bars 24 and welded thereto, these top plates 26 providing in effect an extension of the top flanges of the main longitudinal side frame bar 21 between the cross frame bars 24.

This frame is shown as supported by a pair of tandem axles 30 and 31 which are supported by wheels 32, these wheels being rotatably secured to the axles. One or both groups can be drive wheels, both axles being shown as provided for this purpose with differential housings 33, 34 through which power is transmitted to the drive axle shafts 35 housed within the axles 30, 31 and which are secured to the wheels 32 in the usual and well known manner.

The construction of the tandem axle spring suspension at the left hand side of the truck is the same as the tandem axle spring suspension at the right hand side of the truck and hence a description of the spring suspension at one side of the truck will be deemed to apply to both sides, the same reference numerals being used.

Referring more particularly to the front tandem axle 30, to each end of this axle is secured an axle bracket 36 which is composed of a base casting or bracket member 38 and supports an axle pivot pin bar 39 at its upper end. The base bracket member or casting 38 is shown as having a base plate 40 and a top plate 41 connected by a column 42 and reinforced by side webs 43. Any suitable means can be provided for securing the base casting 40 of each axle bracket 36 to the corresponding end of the front tandem axle 30. For this purpose four vertical bolts 44 are shown as extending through the base plate 40 and through a bottom anchoring plate 45 arranged below the axle. Filler blocks 46 and 48 are shown as interposed between the axle end and the base plate 40 and bottom anchoring plate 45, respectively, and can be welded to the axle end.

The axle pivot pin bar 39 is shown as being of square form in cross section and as removably secured by vertical bolts 49 passing therethrough and through the top plate 41 of the base casting 38. A locating dowel pin 50 also extends through these parts, this dowel serving to initially locate the axle pivot bar and also permitting them to be interchanged at the axle ends, in proper relation, as wear takes place.

A feature of the invention resides in the angularity of generally horizontal axle pivot pins 51 which are integral with and project from the ends of the axle pivot pin bar 39 lengthwise of the frame 20. The axle pivot pins 51 of each axle pivot pin bar are arranged in generally parallel relation to each other but are angularly disposed with reference to the axis of the axle pivot pin bar 39 and the normal line of movement of the vehicle. It will particularly be noted that these axle pivot pins converge or toe in toward the front of the vehicle, this providing for self-steering of the tandem axles as discussed hereinafter in detail.

Each of the axle pivot pins 51 is threaded, as indicated at 52, and is fitted in the threads 53 of the threaded bushing 54 of a shackle 55. These threads 52 and 53 are those of a conventional threaded bearing and have no effective influence on the bearing so far as creating any longitudinal movement of the pivot pins 51 relative to the bearing bushings 54 is concerned. Each axle pivot pin 51 can be provided with an end socket 56 shaped to receive a wrench in assembling or taking apart the shackle structure and the corresponding end of the threaded bushing 54 is formed to provided a lubricant chamber 58 enclosed by a screw cap 59 enclosing the corresponding end of the threaded bore through the threaded bushing. A conventional fitting 60 for forcing grease into the chamber 58 and along the threads 52 and 53 to be expelled at the opposite end of each threaded bushing is mounted on each screw cap 59.

Each shackle 55 is connected by a universal or ball and socket joint, indicated generally at 61, to a crank arm pivot pin 62 at the outer or free end of a crank arm 63, this being an important feature of the invention. For this purpose, the end of each shackle 55 opposite from its threaded bushing 54 is formed to provide a large cylindrical sleeve 64 the axis of which is parallel with the axis of the threaded bushing 54. In the bore of each of these cylindrical sleeves is fitted a sheet metal sleeve 65 having inturned end flanges 66 to retain therein a body 68 of lubricant impregnated material. The bearing comprising the parts 65 and 68 is retained in the sleeve 64 by a pair of end snap rings 69 set in the usual grooves in the bore of this sleeve of the shackle and arranged against the ends of the sheet metal sleeve 65.

The inner surface of the body 68 of lubricant impregnated material is of concave spherical form to fit a ball 70 on the crank arm pivot pin 62. Each ball is interposed between a pair of spaced ears 71 of one of the two spaced lever arms 72 of each crank arm, the pair of lever arms 72 of each crank arm being connected by a tubular hub 73 to which these lever arms are welded. Each ball 70 is spaced from the corresponding pair of ears 71 of the crank arm 63 by suitable thrust washers 74 and each crank arm pivot pin 62 is preferably in the form of a simple bolt having the usual head and nut engaging the outer faces of the corresponding pair of the ears 71.

The tubular hub 73 of each crank arm 63 extends beyond each of its lever arms 72 and these end extensions are journalled in bearings 75 fastened to the inner face of the longitudinal side frame bars 21. These bearings 75 can be of any suitable construction and are shown at the right of Fig. 5 as comprising an externally threaded sleeve 76 welded to the tubular hub 73, and an internally threaded bearing bushing 78 fitting around said sleeve and held in a bearing housing or case 79 fast to the inner face of the corresponding longitudinal side frame bar 21.

The tubular hub 73 of each crank arm 63 extends forwardly a substantial distance from its front bearing 75 and at its extreme forward end has welded thereto a socket member 80 as best shown in Fig. 5. This socket member is preferably reinforced by a surrounding ring 81 and is provided with a bore 82 the end of which can be closed by a plug 83. This bore 82 is preferably oval in cross section to receive the enlarged ovalled live end 84 of a torsion rod 85. The oval bore 82 and ovalled live end 84 are preferably formed in the manner set forth in the Hickman Patent No. 2,213,004, granted August 27, 1940 for Torsion Rod Mounting. Each torsion rod 85 extends rearwardly from the bore through the tubular hub 73 of its crank arm 63 and connects with the rear tandem axle 31 as hereinafter described.

Referring now to the rear tandem axle 31 the spring suspension from each end of this axle to its crank arm is substantially identical with the corresponding parts of the front tandem axle suspension and the same reference numerals have therefore been applied and distinguished by the suffix $a$. Thus, to each end of this rear axle is secured an upstanding axle bracket 36a composed of a base casting or axle bracket member 38a and an axle pivot pin bar 39a bolted to the top face of this base casting by bolts 49a. Any suitable means can be provided for securing each axle bracket 36a to the corresponding end of the tandem axle 31, the base casting or bracket member 38a being shown as having for this purpose a flat base plate 40a connected by four vertical bolts 44a to a bottom anchoring plate 45a. Filler blocks 46a and 48a are shown as interposed between the axle end and the flat base plate 40a and bottom anchoring plate 45a, respectively, and can be welded to the axle end.

It will be noted that each base casting 38a is substantially lower in height than the base castings 38 so that the axle pivot pin bar 39a and its axle pivot pins 51a are arranged at a lower elevation than the corresponding parts of the front tandem axle assembly. It will also be noted that the axle pins 51a are arranged generally in parallel relation to each other but are angularly disposed with reference to the axis of the axle pivot pin bar 39a and the normal line of movement of the vehicle, these axle pivot pins 51a converging toward the front of the vehicle.

On each of these axle pivot pins 51a is rotatably mounted one end 54a of a shackle 55a, the other end of this shackle being formed to provide an enlarged sleeve 64a in which a spherical bearing 68a of lubricant impregnated material is secured. A ball 70a is mounted in this bearing 68a and a crank arm pivot pin 62a extends through this ball.

Each crank arm pivot pin 62a is fast to the outer or free end of a crank arm 86. Each of these crank arms 86 comprises a body 87 which extends longitudinally of the vehicle frame and from each end of which a pair of vertical ears or knuckles 88 project outwardly. Each of these pairs of ears or knuckles 88 embraces the lower end of the corresponding shackle 55a and the corresponding crank arm pivot pin 62a extends through this pair of lever arms or knuckles 88 so as to provide a universal or a ball and socket joint between each shackle 55a and the free or outer end of the crank arm 86.

Each crank arm 86 is disposed below the adjacent longitudinal side frame bar 21 as best shown in Fig. 4, and at its forward end is provided with forwardly projecting fulcrum pivot pin 90 which is journalled in a bearing 91. This bearing 91 can be of any suitable construction and is secured to the adjacent longitudinal side frame bar 21, each of the bearings 91 being shown as provided for this purpose with an upwardly extending plate 92 which can be welded or otherwise secured to the outer face of this longitudinal side frame bar 21.

Each of the crank arms 86 is connected through a pair of gears to the rear end of the companion torsion rod 85. The gearing and gear box forming this connection are the same as shown in my copending application Serial No. 124,961, filed November 2, 1949 for Tandem Axle Spring Suspension and to which reference is made for a more detailed showing of this particular mechanism.

To connect with this gear mechanism, fulcrum pivot pin 93 projects rearwardly from the body 87 of the crank arm 86 in line with the forward fulcrum pin 90 thereof. As best shown in Figs. 6 and 8, this rearwardly projecting fulcrum pivot pin 93 is fitted in a bore at the rear end of the hub 95 of a gear 96 journalled in a gear box 98. This fulcrum pivot pin or hub 93 of each crank arm 86 is also provided with an oval end socket 99 in which is fitted the ovalled end 100 of a splined member 101, the opposite end of this splined member being enlarged and provided with spline grooves 102 fitted in the opposite end 104 of the hub of the gear 96, this end 104 of the hub of the gear 96 being internally splined so that the gear 96 is compelled to turn with the splined member 101, this splined member in turn being compelled to turn with the corresponding crank arm 85.

The gear case 98 is split to provide an inner section 98a and an outer section 98b, these two sections being connected by screws 106. The outer section 98b of the gear box can be secured to the inner face of the corresponding longitudinal side frame bar 21 in any suitable manner, this gear box projecting below this longitudinal side frame bar 21 and the lower flange of this longitudinal side frame bar being cut away for this purpose. To reinforce the rear end of each longitudinal side frame bar 21 so weakened by cutting away a portion of its lower flange to accommodate this gear box, a reinforcing plate 108 is preferably welded or otherwise secured to the outer face of the rear end of the longitudinal side frame bar, this plate also having a downwardly extension 109 which fits against the lower part of the gear box and to which this gear box can also be secured.

The hub ends 95 and 104 of the gear 96 are journalled in bearings 110 arranged in bores jointly provided by the two sections 98a and 98b of the gear box, these bearings preferably being of a lubricant impregnated material. Each of these bearings 110 is also preferably protected by a dust seal in the form of a rubber ring 111 at the outer end thereof. To permit of ready dismantling of the suspension, the two sections 98a and 98b are formed to provide an opening 112 in line with the splined member 101 and of sufficiently large size to permit the splined member 101 to be directly drawn rearwardly through this opening. To prevent accidental displacement of the splined member 101, this opening 112 is provided with a flanged plug 113 which can be secured to the gear case in any suitable manner.

The teeth of the gear 96 mesh with the teeth of a gear 115, this last gear being provided with extended hubs journalled in bearings 116 carried between the two sections 98a, 98b of the gear case in the same manner as with the bearings 110 for the gear 96. Each gear 115 is formed to provide a through bore 118 which is oval in cross section, this oval bore 118 receiving the enlarged ovalled rear end 119 of the torsion rod 85. As with the opposite end 84 of this torsion rod 85, the oval bore 118 and ovalled rear end 119 of the torsion rod are preferably formed in the manner set forth in the Hickman Patent No. 2,213,004, granted August 27, 1940 for Torsion Rod Mounting.

In the operation of the suspension the upward movement of one end of, say, the front axle 30, through its shackle 55, swings the outer end of its crank arm 63 upwardly. This rotates the tube 73, forming the hub of this crank arm in its bearings 75 on the adjacent longitudinal side frame bar 21. Since the forward enlarged ovalled extremity 84 of the torsion rod 85 is connected through the oval bore socket member 80 with this tubular hub 73, this rotation of the tubular hub of the crank arm 63 imparts a twisting or torsional movement of this live end 84 of the torsion rod 85.

This torque of the torsion rod 85 is transmitted through its ovalled rear end 119 and ovalled bore 118 to the upper gear 115. This gear 115 is thereby rotated and rotates its companion gear 96 in the gear box 98. The rotation of the gear 96 rotates the member 101 splined therein and through the ovalled end 119 of this splined member 101 rotates the rear crank arm 86 about its fulcrum pivots 90 and 93.

Because of the gears 96 and 115, this twisting of the torsion rod 85 tends to force the rear crank arm 86 downwardly. This downward force imposed upon the crank arm 86 for the rear axle is transmitted through its shackles 55a directly to the corresponding end of the rear axle 31.

It will be therefore seen that the torsion rod 85 connected through the tubular hub 73 of the crank arm 63 and shackles 55 to the corresponding end of the front axle 30 and also connected through the gears 96 and 115 to the crank arm 86 and shackles 55a for the rear axle 31, provides axle compensation, that is, the transfer of the load from one of the tandem axles to the other, thereby to secure a distribution of the load between the tandem axles. At the same time the torsion rod 85 is of sufficient length to provide the necessary resiliency between the tandem axles 30, 31 and the frame 20 of the truck.

It will be noted that the shackles 55 and 55a are inclined upwardly and inwardly from their respective crank arm pivots 62, 62a to the corresponding axle pivot pins 52, 52a. This upwardly and inward inclined arrangement of the shackles tends to cause each axle to centralize itself in a direction transverse of the frame and enables the action of gravity to geometrically and resiliently resist any movement of either axle away from its central position. This permits the vehicle frame 20 to move substantially straight ahead despite a certain amount of lateral movement of the axles. This arrangement of the shackles further provides high and wide pivot positions which provide increased stability in that these high and wide pivot positions provide effective spring centers which can be as wide or wider than the track of the vehicle. Further, this arrangement reduces side sway, the high and wide pivot positions, together with the upward and inward slant of the shackles, providing a suspension in which the frame 20 is more nearly suspended than mounted. Other important advantages which flow from the inclined arrangement of the shackles as shown are the reduction in the possibility of wheel tramp and in the elimination of the need for antibody roll devices, such as torsion bar stabilizers.

The oblique position of the axes of the pivots 52, 52a of the pin bar 36 on each axle causes either wheel 32 to freely move a short distance rearwardly whenever said wheel rises and, concomitantly, causes this wheel to move a short distance forwardly whenever said wheel falls. This enables the peripheral speed of the wheel to be maintained substantially constant when traveling over irregularities in the road, and, at the same time, enables the axle of the wheel to receive the sudden horizontal thrusts which inevitably result as a consequence of the uniform peripheral speed of the wheel, without imparting these thrusts directly to the frame.

When the vehicle is traveling straight ahead, if the tandem axles 30, 31 are not parallel for any reason, they will automatically assume a parallel position because of the fact that if, for example, the rear axle 31 is out of line it will tend to follow a horizontal arc and this tendency, due to the lateral friction between the tires and the roadway, will cause a lateral movement of the axle relative to the frame. Due to the fact that the shackles 55 and 55a normally extend upwardly and inwardly, this lateral movement is automatically caused to be translated into a slight turning movement, in a horizontal plane, of the whole axle, and this turning movement will continue until both the tandem axles are in line with each other. Such a movement, naturally, causes a change in the angularity of the shackles 55 and 55a at the opposite end of each axle and this change is resisted by gravity which, due to the obliquity of the shackles, is caused to act in a geometric manner. The obliquity of the axle pivot pins 52, 52a is preferably such that when one of the tandem axles moves axially its maximum extent, the wheel 32 at one end thereof will move forwardly about three-quarters of an inch and the wheel 32 at the opposite end thereof will move rearwardly about three-quarters of an inch.

Due to the obliquity or toeing in of the axle pivot pins 52, 52a, the tandem axles 30, 31 are rendered self-steering when making a turn in a road. Thus, these axles tend to trail or follow each other when making a turn in the road as well as when going straight ahead. In making a turn, just as when going straight ahead, the tires naturally tend to resist lateral scuffing and tend to push the axles laterally, and, as a consequence, each axle moves obliquely to eliminate the scuffing. Thus, when the vehicle is making a turn the two rear axles are caused to move automatically to such an oblique position, relatively to each other, as will cause the axes to intersect the axis of revolution of the two front wheels and enables the vehicle to make the turn without tire scuffing. This action occurs when either the vehicle is steered around a long turn in the road or when it is steered sharply on a smooth road, as, for instance, when overtaking a slow vehicle or otherwise avoiding some obstruction. Either axle also tends to assume a slight oblique position when a tendency to tire scuffing occurs because of one wheel or a pair of wheels at one end of either axle has a diameter different from the wheel or pair of wheels at the other end of the same axle. Accordingly wear through tire scuffing when tires of different diameters are used is reduced by the practice of the present invention.

It will be seen that so far as the angularity of the crank arm pivots 52, 52a is concerned, the suspension of the present invention functions in the same manner as the suspension shown in my prior Patent 2,333,650 to render the tandem axles self-steering when rounding a curve and also to cause each axle to move slightly rearwardly on moving upwardly relative to the body and forwardly on moving downwardly. The important distinction between the present invention and the construction shown in this prior patent is that in the present application the axle pivots 52, 52a at each axle end are not in line with each other thereby to permit the shackles to be disposed between the frame and tires of the vehicle and to require less space between the chassis and tires and hence permit the use of such angular pivots with trucks having wider bodies and larger tires. With the companion pairs of crank arm pivots out of line with each other, a ball and socket joint is required at the other end of each shackle to permit twisting of the shackles in following the out of line pivots 52 or 52a as they move up and down in action.

Thus, the suspension shown in my said Patent 2,333,650 has proved entirely practicable with tandem axle highway trailers and also with trucks having 10 inch or smaller tires and 34 inch frames. However, if larger tires were required, the frame width was required to be reduced below 34 inches. Since truck frames are being standardized at 34 inch widths, such a solution was impracticable. The reason for requiring either tires not exceeding 10 inches or frames not exceeding 34 inches was that in the structure disclosed in this patent the crank arm pivot pins of each pair corresponding to the pairs of present pivots 52 or 52a were necessarily spaced a substantial distance from each other and since they were not only disposed angularly but also coaxially, about two inches of space between the frame and each tire of the tandem suspension was used up to accommodate this angularity.

To retain the advantages of automatic steering provided by the angular crank arm pivots of my said Patent 2,333,650 and at the same time reduce the space required between the chassis and tires for their accommodation, the crank arm pivot pins 52, 52a of the present suspension, while parallel in each pair, are arranged out of line with each other so as to save about 1½ inches of space between the frame and each tire of the tandem axle suspension to accommodate these pivot pins and the shackles and axle which they connect. With the crank arm pivot pins 52 or 52a of each pair out of line, the shackles necessarily twist slightly relative to the crank arms as they move vertically with their axle and hence the ball and socket joints 61, 61a are required between each shackle and its crank arm. However, this arrangement of the angular pivot pins 52, 52a and the inclusion of the ball and socket joints 61, 61a permits the suspension to be used with trucks having a standard 34 inch frame and 11 or 12 inch tires.

Another important advantage of the present invention resides in the construction and arrangement of the parts for easy servicing.

It will be noted that the frame journal bearings 75 can be made large enough to accommodate materials sufficient to operate for several years or several hundred thousand miles of vehicle travel without servicing. Since the shackle bearings are smaller in size servicing might be required at more frequent intervals, in the order of from one to two hundred thousand miles. The present suspension is therefore designed to facilitate service of the shackle bearings and to avoid the necessity for field repair or replacements thereof. To this end the entire shackle assembly can readily be removed by merely jacking up the vehicle frame and removing a few readily accessible parts, following which a new or rebuilt shackle assembly can be substituted and the vehicle frame let down. The worn shackle assembly can then be sent to the factory for rebuilding where tools and materials are available for restoring it to its original condition, such being impossible with field repair work with structures of this nature.

More specifically, to remove the more rapidly wearing shackles without disturbing the bearings thereof or the other parts of the suspension, the field operations require only the following steps:

The mechanics first jack up the chassis 20.

They then remove the four crank arm pivot pin bolts 62, 62a for each axle. This disconnects the axles from the frame 29. It will be noted that in so removing the pivot bolts 62, 62a, the ball and socket bearing is not disturbed so that when replacing the shackle assembly no dirt will get into the new bearings. The mechanics then remove the bolts 49, 49a, following which the shackle assemblies for each axle can be lifted therefrom. These can then be replaced with new or rebuilt shackle assemblies and the truck promptly placed in service for another one to two hundred thousand miles of travel. The removed shackle assemblies are relatively light and easily handled and can be sent back to the factory where tools for repair, replacement and proper alinement are available. Further, it will be noted that for so replacing the shackles the truck is out of service for only a very short length of time.

It will also be understood that the grease fitting 60 can be substituted with a self-feeding grease fitting so that lubrication is only required at very long intervals.

From the foregoing it will be seen that the invention is particularly applicable to trucks having low and wide frames and large tires and achieves the stated objects in a simple and inexpensive construction.

I claim:

1. A tandem axle vehicle spring suspension adapted to be interposed between a vehicle frame and a pair of tandem axles each having wheels journalled thereon, comprising a generally horizontal crank arm means arranged above each of said axles at each side of said frame, a pivotal connection between the fulcrum of each of said crank arm means and said frame with its axis extending lengthwise of said frame, a pair of shackles arranged in spaced relation to each other lengthwise of said frame adjacent each end of each axle, a pivot joint between one end of each shackle and the adjacent end of the corresponding axle, another pivot joint between the other end of each shackle and the free end of the corresponding crank arm means, one of said pivot joints of each shackle being an axially elongated pin and sleeve pivot joint rotating about an axis maintained at all times in angular relation to the line of travel of the vehicle and parallel and alongside the axis of the same pivot joint of its companion shackle and said axes at one end of each axle being maintained at all times in forwardly converging relation to said axes at the opposite end of the same axle, and the other pivot joint of each shackle being a universal joint, and spring means yieldingly resisting upward movement of said axles relative to said frame.

2. A tandem axle vehicle spring suspension adapted to be interposed between a vehicle frame and a pair of tandem axles each having wheels journalled thereon, comprising a generally horizontal crank arm means arranged above each of said axles at each side of said frame, a pivotal connection between the fulcrum of each of said crank arm means and said frame with its axis extending lengthwise of said frame, a pair of shackles arranged in spaced relation to each other lengthwise of said frame adjacent each end of each axle, an axially elongated pin and sleeve pivot joint between one end of each shackle and the adjacent end of the corresponding axle and rotating about an axis maintained at all times in angular relation to the line of travel of the vehicle and parallel and alongside the axis of the same pivot joint of its companion shackle and said axes at one end of each axle being maintained at all times in forwardly converging relation to said axes at the opposite end of the same axle, a universal joint between the other end of each shackle and the free end of the corresponding crank arm means, and spring means yieldingly resisting upward movement of said axles relative to said frame.

3. A tandem axle vehicle spring suspension adapted to be interposed between a vehicle frame and a pair of tandem axles each having wheels journalled thereon, comprising a generally horizontal crank arm means arranged above each of said axles at each side of said frame, a pivotal connection between the fulcrum of each of said crank arm means and said frame with its axis extending lengthwise of said frame, a pair of shackles arranged in spaced relation to each other lengthwise of said frame adjacent each end of each axle, an axially elongated pin and sleeve pivot joint between one end of each shackle and the adjacent end of the corresponding axle and rotating about a generally horizontal axis maintained at all times in forwardly converging relation to a centerline of said frame and parallel and alongside the axis of the same pivot joint of its companion shackle and said axes at one end of each axle being maintained at all times in forwardly converging relation to said axes at the opposite end of the same axle, a universal joint between the other end of each shackle and the free end of the corresponding crank arm means, and spring means yieldingly resisting upward movement of said axles relative to said frame.

4. A tandem axle vehicle spring suspension adapted to be interposed between a vehicle frame and a pair of tandem axles each having wheels journalled thereon, comprising a generally horizontal crank arm means arranged above each of said axles at each side of said frame, a pivotal connection between the fulcrum of each of said crank arm means and said frame with its axis extending lengthwise of said frame, a pair of shackles arranged in spaced relation to each other lengthwise of said frame adjacent each end of each axle, a pivot joint between one end of each shackle and the adjacent end of the corresponding axle, another pivot joint between the other end of each shackle and the free end of the corresponding crank arm means, one of said pivot joints of each shackle being an axially elongated pin and sleeve pivot joint rotating about an axis maintained at all times in angular relation to the line of travel of the vehicle and parallel and alongside the axis of the same pivot joint of its companion shackle and said axes at one end of each axle being maintained at all times in forwardly converging relation to said axes at the opposite end of the same axle and the other pivot joint of each shackle being a ball joint, and spring means yieldingly resisting upward movement of said axles relative to said frame.

5. A tandem axle vehicle spring suspension adapted to be interposed between a vehicle frame and a pair of tandem axles each having wheels journalled thereon, comprising a generally horizontal crank arm means arranged above each of said axles at each side of said frame, a pivotal connection between the fulcrum of each of said crank arm means and said frame with its axis extending lengthwise of said frame, a pair of shackles arranged in spaced relation to each other lengthwise of said frame adjacent each end of each axle, a pivot joint between one end of each shackle and the adjacent end of the corresponding axle, another pivot joint between the other end of each shackle and the free end of the corresponding crank arm means, one of said pivot joints of each shackle being an axially elongated pin and sleeve pivot joint rotating about an axis maintained at all times in angular relation to the line of travel of the vehicle and parallel and alongside the axis of the same pivot joint of its companion shackle and said axes at one end of each axle being maintained at all times in forwardly converging relation to said axes at the opposite end of the same axle, and the other pivot joint of each shackle being a universal joint, and a rotary spring connecting the crank arm means at each side of the vehicle to rotate in unison.

6. A tandem axle vehicle spring suspension adapted to be interposed between a vehicle frame and a pair of tandem axles each having wheels journalled thereon, comprising a generally horizontal crank arm means arranged above each of said axles at each side of said frame, a pivotal connection between the fulcrum of each of said crank arm means and said frame with its axis extending lengthwise of said frame, a pair of shackles arranged in spaced relation to each other lengthwise of said frame adjacent each end of each axle, an axially elongated pin and sleeve pivot joint between one end of each shackle and the adjacent end of the corresponding axle and rotating about a generally horizontal axis maintained at all times in forwardly converging relation to a centerline of said frame and parallel and alongside the axis of the same pivot joint of its companion shackle and said axes at one end of each axle being maintained at all times in forwardly converging relation to said axes at the opposite end of the same axle, a universal joint between the other end of each shackle and the free end of the corresponding crank arm means, and a rotary spring connecting the crank arm means at each side of the vehicle to rotate in unison.

7. A tandem axle vehicle spring suspension adapted to be interposed between a vehicle frame and a pair of tandem axles each having wheels journalled thereon, comprising a crank arm arranged above each of said axles at each side of said frame and having an elongated hub journalled on said frame to extend lengthwise thereof and having a pair of vertical ears at each end of said hub extending outwardly therefrom, a shackle associated with each of said pair of ears, a pivot joint between one end of each shackle and the adjacent end of the corresponding axle, another pivot joint between the other end of each shackle and the corresponding pair of said ears, one of said pivot joints of each shackle being an axially elongated pin and sleeve pivot joint rotating about an axis maintained at all times in angular relation to the line of travel of the vehicle and parallel and alongside the axis of the same pivot joint of its companion shackle and said axes at one end of each axle being maintained at all times in forwardly converging relation to said axes at the opposite end of the same axle, and the other pivot joint of each shackle being a universal joint, and spring means yieldingly resisting upwardly movement of said axles relative to said frame.

8. A tandem axle vehicle spring suspension adapted to be interposed between a vehicle frame and a pair of tandem axles each having wheels journalled thereon, comprising a crank arm arranged above each of said axles at the corresponding side of said frame and having an elongated hub journalled on said frame to extend lengthwise thereof and having a pair of vertical ears at each end of said hub extending outwardly therefrom, a bearing ball interposed between each pair of said ears, a pin extending through each pair of said ears and the corresponding ball, a shackle associated with each pair of said ears, a spherical socket bearing on the lower end of each shackle and embracing said ball, a pivot joint between the upper end of each shackle and the corresponding axle and rotating about an axis maintained in angular relation to the line of travel of said vehicle and parallel and alongside the axis of the same pivot joint of its companion shackle, and spring means yieldingly resisting upward movement of said axles relative to said frame.

9. A tandem axle vehicle spring suspension adapted to be interposed between a vehicle frame and a pair of tandem axles each having wheels journalled thereon, comprising a crank arm arranged above each of said axles at the corresponding side of said frame and having an elongated hub journalled on said frame to extend lengthwise thereof and having a pair of vertical ears at each end of said hub extending outwardly therefrom, a bearing ball interposed between each pair of said ears, a pin extending through each pair of said ears and the corresponding ball, a shackle associated with each pair of said ears, a spherical socket bearing on the lower end of each shackle and embracing said ball, a pivot joint between the upper end of each shackle and the corresponding axle and rotating about a generally horizontal axis maintained in forwardly converging relation to a centerline of said frame and parallel and alongside the axis of the same pivot joint of its companion shackle, said ball and pivot joint being arranged so that each of said shackles extends upwardly and inwardly from its pivot joint to its said ball, and spring means yieldingly resisting upward movement of said axles relative to said frame.

10. A tandem axle vehicle spring suspension adapted to be interposed between a vehicle frame and a pair of tandem axles each having wheels journalled thereon, comprising a crank arm arranged above each of said axles at the corresponding side of said frame and having an elongated hub journalled on said frame to extend lengthwise thereof and having a pair of vertical ears at each end of said hub extending outwardly therefrom, a bearing ball interposed between each pair of said ears, a pin extending through each pair of said ears and the corresponding ball, a shackle associated with each pair of said ears, a spherical socket bearing on the lower end of each shackle and embracing said ball, a pivot joint between the upper end of each shackle and the corresponding axle and rotating about a generally horizontal axis maintained in forwardly converging relation to a centerline of said frame and parallel and alongside the axis of the same pivot joint of its companion shackle, said ball and pivot joint being arranged so that each of said shackles extends upwardly and inwardly from its said pivot joint to its said ball, and a rotary spring connecting said hubs of said crank arms at each side of said frame to rotate in unison 11. In a vehicle spring suspension adapted to be interposed between a vehicle frame and an axle having wheels journalled thereon, a generally horizontal crank arm means arranged above at least one end of said axle, a pivotal connection between the fulcrum of said crank arm means and said frame with its axis extending lengthwise of said frame, a pair of shackles arranged in spaced relation to each other lengthwise of said frame at said one end of said axle, a removable pivot pin connecting one end of each of said shackles with the free end of said crank arm means and extending lengthwise of said frame, an axle bracket member fast to and rising from said one end of said axle, an axle pivot pin bar removably secured to the upper end of said axle bracket member and having integral axially elongated axle pivot pins projecting from its opposite ends lengthwise of said frame, axially elongated sleeves embracing and pivotally connecting the other end of each of said shackles with the corresponding one of said axle pivot pins, and spring means yieldingly resisting upward movement of said axle relative to said frame, said shackles being removable from said frame and axle by removing said removable pivot pins and removing said axle pivot pin bar from said axle bracket member.

12. In a vehicle spring suspension adapted to be interposed between a vehicle frame and an axle having wheels journalled thereon, a generally horizontal crank arm means arranged above at least one end of said axle, a pivotal connection between the fulcrum of said crank arm means and said frame with its axis extending lengthwise of said frame, a pair of shackles arranged in spaced relation to each other lengthwise of said frame at said one end of said axle, a pivot pin associated with each of said shackles and removably secured to the free end of each of said crank arm means, a bearing member penetrated by each of said pivot pins, each shackle having its lower end journalled on a corresponding one of said bearing members, an axle bracket member fast to and rising from said one end of said axle, an axle pivot pin bar removably secured to the upper end of said axle brackets and having integral axially elongated axle pivot pins projecting from its opposite ends lengthwise of said frame, axially elongated sleeves embracing and pivotally connecting the upper end of each of said shackles with the corresponding one of said axle pivot pins, and means yieldingly resisting upward movement of said axle relative to said frame, said shackles being removable from said frame and axle by removing said removable pivot pins and removing said axle pivot pin bar from said axle bracket member.

13. A vehicle spring suspension adapted to be interposed between a vehicle frame and an axle having wheels journalled thereon, comprising a crank arm arranged above at least one end of said axle and having an elongated hub journalled on said frame to extend lengthwise thereof and having a pair of vertical ears at each end of said hub extending outwardly therefrom, a removable pivot pin extending through each of said pairs of ears lengthwise of said frame, a bearing member between the ears of each pair and penetrated by the corresponding removable pivot pin, a shackle associated with each pair of said ears and having its lower end journalled on the corresponding one of said bearing members, an axle bracket member fast to and rising from said one end of said axle, an axle pivot pin bar removably secured to the upper end of said axle bracket and having integral axially elongated axle pivot pins projecting from its opposite ends lengthwise of said frame, axially elongated sleeves embracing and pivotally connecting the upper end of each of said shackles with the corresponding one of said axle pivot pins, and means yieldingly resisting upward movement of said axle relative to said frame, said shackles being removable from said frame and axle by removing said removable pivot pins and removing said axle pivot pin bar from said axle bracket member.

14. In a tandem axle vehicle spring suspension adapted to be interposed between a vehicle frame and a pair of tandem axles each having wheels journalled thereon, a generally horizontal crank arm means arranged above one end of at least one of said axles, a pivotal connection between the fulcrum of said crank arm means and said frame with its axis extending lengthwise of said frame, a pair of shackles arranged in spaced relation to each other lengthwise of said frame at said one end of said axle, a removable pivot pin connecting one end of each of said shackles with the free end of said crank arm means and extending lengthwise of said frame, an axle bracket fast to and rising from said one end of said axle, an axle pivot pin bar removably secured to the upper end of said axle bracket member and having integral axially elongated axle pivot pins projecting from its opposite ends lengthwise of said frame, axially elongated sleeves embracing and pivotally connecting the other end of each of said shackles with the corresponding one of said axle pivot pins, and spring means yieldingly resisting upward movement of said axles relative to said frame, said shackles being removable from said frame and axle by removing said removable pivot pins and removing said axle pivot pin bar from said axle bracket member.

15. A tandem axle vehicle spring suspension adapted to be interposed between a vehicle frame and a pair of tandem axles each having wheels journalled thereon, comprising a generally horizontal crank arm means arranged above each end of each of said axles, a pivotal connection between the fulcrum of each of said crank arm means and said frame with its axis extending lengthwise of said frame, a pair of shackles adjacent each end of each of said axles with the shackles of each pair arranged in spaced relation to each other lengthwise of said frame, a pair of removable pivot pins associated with each pair of shackles and connected with each of said crank arm means and extending lengthwise of said frame, an axle bracket fast to and rising from each end of each of said axles, generally horizontal axle pivot pins projecting from the opposite ends of said axle pin bar and each pivotally connected to one end of a corresponding shackle, said axle pivot pins being inclined in a horizontal direction to converge toward the front of said frame, a universal joint pivotally connecting the other end of each of said shackles with the corresponding one of said removable pivot pins, and spring means yieldingly resisting upward movement of said axles relative to said frame, said shackles being removable from said frame and axles by removing said removable pivot pins and removing said axle pivot pin bars from said axle bracket member.

16. In a tandem axle vehicle spring suspension adapted to be interposed between a vehicle frame and a pair of tandem axles each having wheels journalled thereon, a crank arm arranged above at least one end of one of said axles and having an elongated hub journalled on said frame to extend lengthwise thereof and having a pair of vertical ears at each end of said hub extending outwardly therefrom, a removable pivot pin extending through each of said pairs of ears lengthwise of said frame, a ball between the ears of each pair and penetrated by the corresponding removable pivot pin, a shackle associated with each pair of said ears and having its lower end journalled on the corresponding one of said balls, an axle bracket member fast to and rising from said one end of said axle, an axle pivot pin bar removably secured to the upper end of said axle bracket and having axle pivot pins projecting from its opposite ends lengthwise of said frame, means pivotally connecting the upper end of each of said shackles with the corresponding one of said axle pivot pins, and means yieldingly resisting upward movement of said axles relative to said frame, said shackles being removable from said frame and axles by removing said removable pivot pins and removing said axle pivot pin bar from said axle bracket member.

ALBERT F. HICKMAN.

REFERENCES CITED

The following references are of record in the file of this patent:

UNITED STATES PATENTS

| Number | Name | Date |
|---|---|---|
| 2,290,181 | Hickman | July 21, 1942 |
| 2,404,794 | Fageol | July 30, 1946 |
| 2,428,160 | Holmstrom et al. | Sept. 30, 1947 |
| 2,435,199 | Buckendale | Feb. 3, 1948 |
| 2,448,224 | Low | Aug. 31, 1948 |